Dec. 22, 1964 M. P. MATTHEW 3,162,058
VARIABLE SPEED TRANSMISSION
Filed Aug. 10, 1961 2 Sheets-Sheet 1
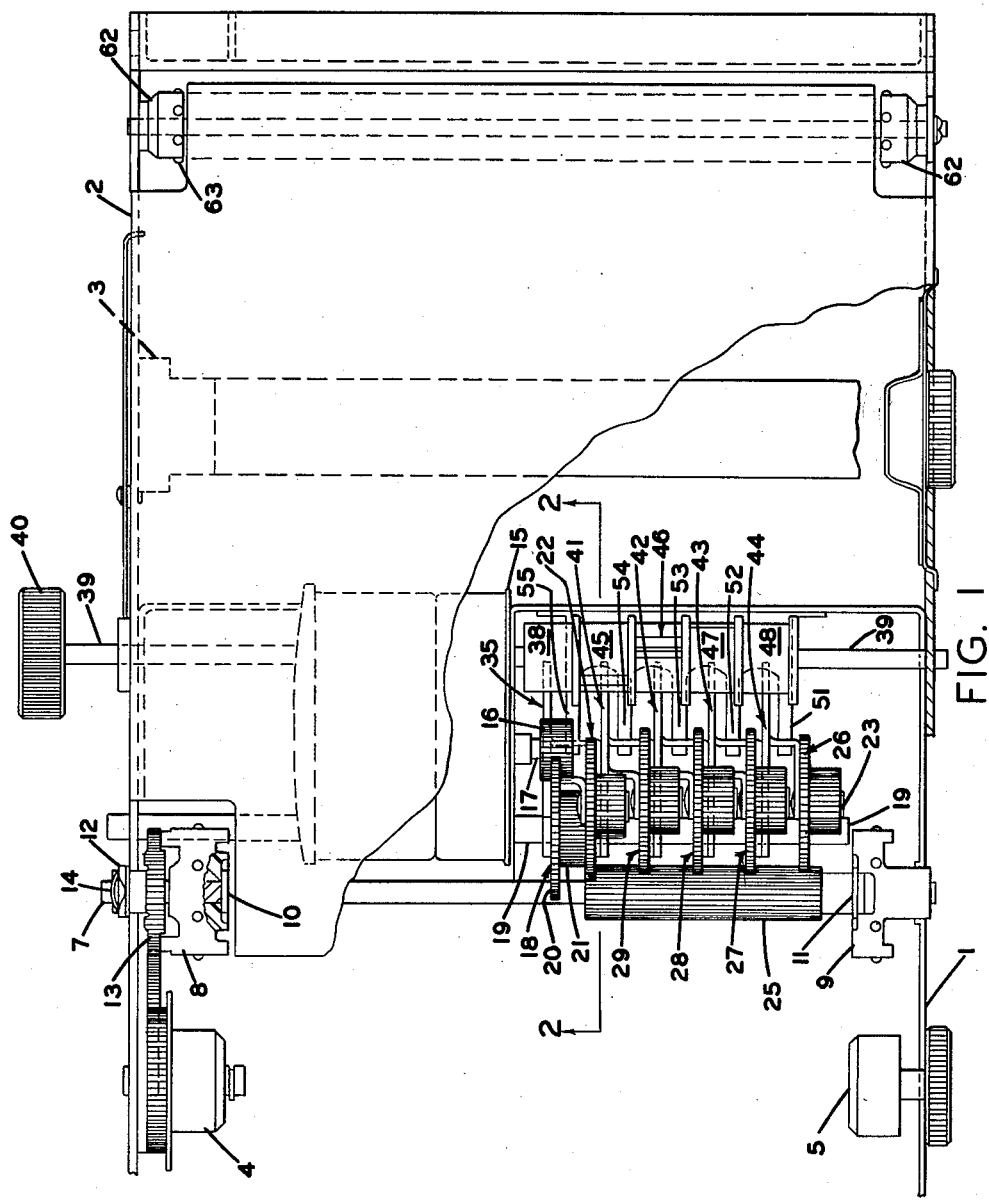
INVENTOR.
MORTON P. MATTHEW
BY
ATTORNEYS Dec. 22, 1964    M. P. MATTHEW    3,162,058
VARIABLE SPEED TRANSMISSION
Filed Aug. 10, 1961    2 Sheets-Sheet 2
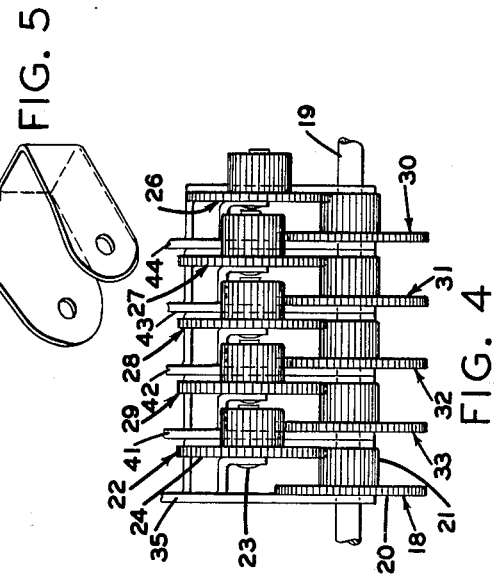
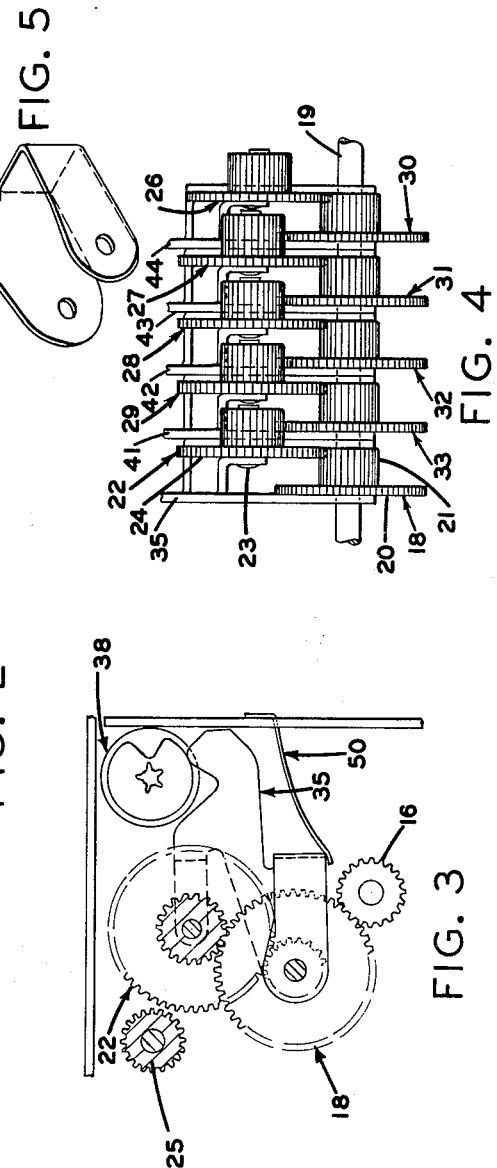
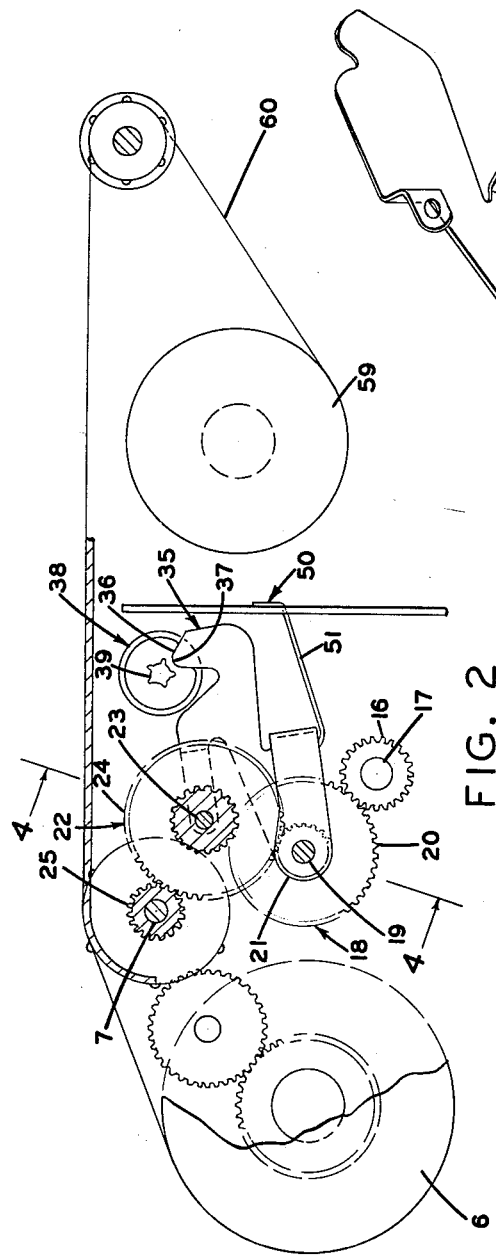
INVENTOR.
MORTON P. MATTHEW
BY
ATTORNEYS

United States Patent Office 3,162,058
Patented Dec. 22, 1964

3,162,058
VARIABLE SPEED TRANSMISSION
Morton P. Matthew, Norwalk, Conn., assignor to Bausch & Lomb Incorporated, Rochester, N.Y., a corporation of New York
Filed Aug. 10, 1961, Ser. No. 130,593
8 Claims. (Cl. 74—354)

This invention relates to a variable speed transmission and more particularly to a variable speed transmission for operation within a chart recording instrument.

The paper chart in a conventional chart recording instrument rolls across a table to provide a means for recording data. A pen records the information on the chart as it is moved across the table of the recording machine. A single speed of the chart fails to provide an accurate picture of the recording data due to varying rates of fluctuations of the recording pen. A greater rate of movement of the pen requires a higher rate of movement of the chart. Accordingly, this instrument employs a variable speed transmission with a sufficient number of speeds to clearly record data although the amplitude and rate of fluctuations of the pen vary substantially. Variations in the speed of the transmission are accomplished by merely rotating a cam shaft carrying a number of cams which selectively and alternatively engages one of a number of output gears in a gear train with a common driven gear. The driven gear drives the chart at the selected speed to provide the required recording of information.

It is an object of this invention to provide a common driving shaft means and a common driven shaft means connected by a constant speed gear train with means for selectively engaging one of a plurality of output gears from said gear train with said driven gear for selectively changing the output speed of said driven shaft.

It is another object of this invention to provide a constant speed gear train having means for selectively meshing one of a plurality of output gears with a common driven gear to provide a variable speed transmission.

It is a further object of this invention to provide a vairable speed transmission employing a gear train of constant speed with means for selectively engaging one of a plurality of output gear means to engage a driven gear means to provide the selected output speed of the transmission.

It is a further object of this invention to provide a variable speed transmission having a driving shaft means rotating at a constant speed and a driven shaft means rotating at a variable speed connected through a constant speed gear train with means for selectively engaging elements of said gear train with said driven shaft means to provide a variable speed transmission.

The objects of this invention are accomplished through the use of a constant speed drive means operating a constant speed gear train to provide constant speed of rotation throughout the gear train. A variable speed driven shaft is connected to a driven gear. A cam means is positioned to alternatively and selectively engage one of a plurality of gears in the gear train with the driven gear. The gear train includes an input gear and a plurality of intermediate gears on a common axis. A plurality of output gears from the gear train are supported on a plurality of brackets which are pivotally mounted on the shaft supporting the intermediate gears. The cam means selectively rotates one of the plurality of brackets carrying an output gear to selectively and alternatively engage the variable speed driven gear.

Other objects and advantages will be apparent from the following detail description taken with the drawings.

FIG. 1 is a plan view of the transmission in the recording instrument with certain sections broken away to clarify the relative location of the various parts.

FIG. 2 is a cross section view taken on line 2—2 of FIG. 1.

FIG. 3 is a fragmentary cross section view taken on the same section line as FIG. 2 with the output gear of the gear train disengaged from the driven gear.

FIG. 4 is a section view taken on line 4—4 of FIG. 2.

FIG. 5 is a three dimensional view of one of the plurality of brackets for supporting the output gears of the gear train.

Referring to the drawing, FIG. 1 illustrates a plan view of the recording instrument. A section of the recording instrument is broken away to illustrate the location of the transmission for driving the chart mechanism. The chassis 1 supports the mechanism of the recorder. A table 2 is also supported on the chassis and provides a smooth surface for the moving chart as the recording mechanism is in operation.

The idling paper roller 3 is supported under the table 2. The paper rolls over the table 2 and onto the paper cones 4 and 5 on the opposite end of the recording instrument.

A paper roll 6 shown in FIG. 2 is driven by the paper cones 4 and 5 with the drive mechanism connected to the driven shaft 7. The driven shaft 7 is connected to the chart pulleys 8 and 9 by means of the pins 10 and 11 respectively. The drive mechanism is connected to the chart pulley 8 through the friction of the lateral surfaces of the chart gear 13, due to the biasing force of the spring 14.

A motor 15 is supported on a chassis 1 and rotates the driving gear 16 through the drive shaft 17. The motor 15 is a constant speed motor to provide a constant output speed for the driving gear 16.

Referring to FIG. 2 the variable speed transmission is shown in a side view. The relative position of the shafts in the driving position is illustrated.

The driving gear 16 is in constant engagement with the integral pinion and spur gear 18. The shaft 19 is supported on the chassis 1. The shaft 19 rotatably supports a plurality of intermediate pinion and spur gears on a common center with the input pinion and spur gear 18. The spur gear 20 of the integral pinion and spur gear 18 meshes with the constant speed driving gear 16. The pinion 21 of the intermediate integral pinion and spur gear 18 is in constant engagement with the integral output pinion and spur gear 22. The rivet, 23, rotatably supports the integral output pinion and spur gear 22. In the position as illustrated the spur gear 24 of integral pinion and spur gear 22 is meshing with the driven gear 25. The driven gear 25 extends laterally to engage one of the five integral output pinion and spur gears 22, 26, 27, 28 and 29. Each of the integral output pinion and spur gears is adapted for pivotal movement with its supporting bracket about the shaft 19 for engagement with the driven gear 25 which is connected to a driven shaft 7. A plurality of integral intermediate pinion and spur gears 18, 30, 31, 32 and 33 are rotatably mounted on the shaft 19 having a common center of rotation with each other. The gears 18, 30, 31, 32 and 33 are rotatably supported on the shaft 19 and rotate independently of each other. The gears 22, 26, 27, 28 and 29 are also rotatably mounted for independent rotation relative to each other. These ten gears, however, form a gear train which is in constant rotation providing a reduction gear system of which the gear 26 rotates at the slowest rate. The input gear 18 rotates at the fastest rate and is rotated by the driving gear 16.

FIG. 2 illustrates the positioning of the bracket 35, which is rotatably supported on the shaft 19, and is rotatably supporting the integral pinion and spur gear 22 on the rivet 23. The bracket 35 is formed with a follower 36 on the extended end portion of the bracket. The follower is positioned in a cam slot 37 in the cam 38. A plurality of cams 38, 45, 46, 47 and 48 are angularly spaced about the cam shaft 39 with slots to selectively receive the followers on their mating brackets. The plurality of brackets 35, 41, 42, 43 and 44, engage the cams 38, 45, 46, 47 and 48 respectively. The cams are identical, however, the cam slot of each cam is angularly spaced about the cam shaft 39. The cam slots are angularly spaced at intervals of 72 degrees to provide selective engagement of successive output gears with the driven gear 25 in providing variable speed output upon rotation of the knurled knob 40 operating the cam shaft 39.

The plurality of brackets 35, 41, 42, 43 and 44 are biased to an engaging position with their respective cams due to the biasing force of the flat spring 50. The flat spring 50 has a plurality of leaves 51, 52, 53, 54 and 55 which engage the brackets 44, 43, 42, 41 and 35 respectively. Others types of springs would serve equally as well. When the cam shaft 39 is rotated so that the cam slot of a particular cam receives the cam follower of its mating bracket, the biasing force of the mating leaf on the flat spring 50 biases the output gear of the gear train to an engaging position with the variable speed driven gear 25. The position of engagement for the output gear of the gear train engaging with the variable speed driven gear is illustrated in FIG. 2. FIG. 3 illustrates the position whereby the driven gear is not in engagement with the output gear from the gear train. FIG. 3 illustrates the cam rotated so the outer periphery and arcuate portion of the cam is engaging the cam follower of the respective bracket. The cam pivots the bracket against the biasing force of a spring to disengage the output gear from the driven gear 25. The variable speed transmission operates through one of the output gears of the gear train. The four output gears which are not engaging the driven gear are held in spaced relation to the driven gear by their respective cam. The constant engagement of the pinion and spur gears is illustrated in FIG. 4. The driving gear 16 is constantly meshed with the spur gear 20 of the intermediate integral pinion and spur gear 18. The pinion 21 of this gear combination is constantly meshing with the spur gear 24 of the integral output pinion and spur gear 22. The pinions of all these pinion and spur gear combinations drive a mating spur gear on a parallel shaft. The center dimensions of the intermediate gears and the output gears remain constant and for this reason the gear train is in constant engagement. The variable speed of the transmission is accomplished by engaging and disengaging an output spur gear with the driven gear 25 on shaft 7. It is not necessary that all gears in the gear train be of the same pitch diameter.

It is desirable, for simplicity and for duplication economies, to maintain the same center distance between gears 18 and 22, 30 and 26, 31 and 27, 32 and 28, and 33 and 29, respectively. Many choices of gear combinations, giving a wide range of speed ratios, are possible without changing this common center distance. However, any bracket could be altered to permit a different gear combination requiring a different center distance. This will allow a still wider selection of speed ratios. The variable speed transmission of the recording instrument operates in the following described manner.

The paper roll 59 unrolls over the table 2 and rerolls on the roll 6 as the recording device is in operation. The chart 60 rolls over the table 2 which forms a backing for the stylus (not shown) recording the information on the chart. The driving mechanism has a slipping clutch arrangement to provide a variation in the speed of the winding of the roll 6 as the mechanism is in operation. A friction device, not shown, prevents the roll 59 from unrolling too rapidly. The chart is aligned by the idler pulleys 62. A plurality of protrusions 63 extend through perforation in the chart 60 as it rolls on the idler pulleys 62. Similar protrusions are also formed on the chart drive pulleys 8 and 9 which extend through the perforations in the chart 60. The drive chart pulleys roll the chart over the table 2 as the device is in operation. The speed of the chart rolling over the table 2 is controlled by the variable speed mechanism. The speed is selectively controlled through the knurled knob 40 and shaft 39 which extends laterally from the recording mechanism. The rotation of the knurled knob rotates the cam shaft 39 and the plurality of cams 38, 45, 46, 47 and 48. The desired cam slot is rotated to receive the mating cam follower of the engaging bracket. In this manner the biasing force of the spring 50 biases the cam follower of the bracket for reception within the mating cam slot and engagement of the desired output gear with the driven gear 25. The driven gear 25 is keyed to the driven shaft 7. The driven shaft 7 is connected to the chart driving pulleys 8 and 9 through the pins 10 and 11 respectively. The motor 15 is a constant speed motor which drives a constant speed gear 16 which constantly meshes the spur gear 20 of the integral pinion and spur gear 18. The gear train comprising the integral pinion and spur gears 18, 33, 32, 31 and 30 which constantly mesh mating pinion and spur gears 22, 29, 28, 27 and 26 respectively. The gear train is a reduction mechanism which provides a constantly reduced rate of rotation of each subsequent gear in the gear train. The plurality of output integral pinion and spur gears 22, 29, 28, 27 and 26 may be selectively brought into engagement one at a time with the driven gear 25. The selective engagement has been previously described as being controlled manually through the cam shaft 39 and the plurality of cams.

The constant speed driving gear 16 and the gear train provide a constant speed mechanism. The variable speed driven gear 25 rotates at a selected output speed depending upon engagement of the particular output gear from the gear train which meshes with the output driven gear 25. In the process of selecting the output gear of the gear train, the cam shaft 39 is rotated in such a manner that the desired cam receives the cam follower on the bracket supporting the output gear to be meshed with the driven gear 25. The leaf spring 50 provides a biasing force to pivot the bracket carrying the output gear to engage with the driven gear 25. The reduction of the speed in the gear train is constant. The speed selected for the driven gear 25 is dependent upon the number of gears in the gear train which are used to transmit the rotation from the driving gear 16 to the driven gear 25 and upon the respective gear tooth combinations. The greater the number of the gears in the gear train which are required to transmit the rotation, the greater the reduction in gear rotation. The device as illustrated provides five speeds for the chart of the recording device. Any number of speeds could be incorporated in this type of a device, depending on the number of gears in the gear train and the number of cams carried on the cam shaft to selectively engage gears for engagement with the driven gear 25.

This invention is not limited to cams for pivoting or rocking the brackets and engaging the gears. A series of levers or push-buttons, for example, could perform this function.

It will be apparent that a definite direction of rotation is required for the train of gears in order to move the chart 60 from roll 59 to roll 6. This variable speed transmission could be used in the reverse direction also, with appropriate modifications outside the transmission. Within the transmission, in the reversed direction the output gear would tend to disengage the driven gear under load, and the spring 50 would have to be strong enough to overcome this tendency, unless additional locking means were provided. As described for normal rotation, however, the tooth loads will be such as to maintain engagement under load, so that the heavier the driving load, the stronger the force maintaining tooth engagement.

Inasmuch as all but the selected bracket and output gear are, by the cams 38, etc., positively held out of engagement from the driven gear 25, there can be no ambiguity about the selected speed, as might conceivably happen if brackets were cammed selectively into instead of out of engagement, and springs were used to effect subsequent disengagement.

It is understood that the above described arrangement is illustrative and descriptive in setting forth the invention covered herein. Other modifications may illustrate and describe this invention without departing from the spirit of the invention. All equivalent disclosures falling within the principle of the invention are considered to be a part thereof.

What is claimed is:

1. A variable speed transmission comprising in combination, a driving gear, a driven gear, a gear train including, at least two intermediate gears in said gear train and one of said intermediate gears meshing with said driving gear, at least two output gears having at least one of said output gears engaging one of said intermediate gears, means pivotally supporting said output gears about the axis of said intermediate gears in said gear train and for rotation on axes parallel with said intermediate gear axis, means selectively engaging one of said output gears of said gear train with said driven gear to selectively and alternatively provide a means for varying the output speed of the transmission.

2. A variable speed transmission comprising in combination, a driving gear, a driven gear, a gear train for transmitting a driving force including, at least two intermediate gears in said gear train the first for meshing with said driving gear, at least two output gears having at least one of said output gears engaging one of said intermediate gears, means pivotally supporting said output gears about the axis of said intermediate gears, said output gears in said gear train supported for selectively engaging said driven gear, means selectively meshing one of said output gears in said gear train with said driven gear to provide a variable speed output from the transmission.

3. A variable speed transmission comprising in combination, a driving gear, a driven gear, a gear train operatively engaging said driving gear and said driven gear including, an intermediate shaft, a set of intermediate independently rotatable integral pairs of gears rotatable on said intermediate shaft having one of said intermediate gears engaging said driving gear, a plurality of brackets pivotally supported on said intermediate shaft, a set of output independently rotatably integral pairs of gears each mounted on a supporting bracket and engaging a mating intermediate gear in said set of intermediate pairs of gears, means engaging each of said plurality of brackets to selectively and alternatively engage one of said gears of said set of output gears with said driven gear to provide a variable speed output for the transmission.

4. A variable speed transmission comprising in combination, a driving gear, a driven gear, a gear train operatively engaging said driving gear and said driven gear and including, a shaft, a first set of integral pinion and spur gears independently rotatable on said shaft, the first gear of said first set of gears engaging said driving gear, a plurality of gear supporting brackets pivotally supported on said shaft, a second set of integral pinion and spur gears having one gear engaging one of said first set of gears, each of said second set of gears rotatably mounted on one of said supporting brackets, selector means engaging said plurality of brackets to selectively and alternatively bias one of said plurality of brackets to a position whereby one gear of said second set of gears is in engagement with said driven gear to provide a variable speed output of said transmission.

5. A variable speed transmission comprising in combination, a driving gear, a driven gear, a gear train operatively engaging said driving gear and said driven gear, said gear train including, a plurality of intermediate integral pinion and spur gears independently rotatable about a common axis, the first gear of said plurality of intermediate integral pinion and spur gears meshing with said driving gear, a plurality of gear supporting brackets pivotally supported on the axis common with said common gear axis, a plurality of output integral pinion and spur gears each of which is mounted independently and rotatable on one of said plurality of gear supporting brackets, each of said output gears and said intermediate gears forming a continuous driving gear train from said driving gear to the end of said gear train, means engaging said brackets for alternatively and selectively pivoting one of said brackets about the common axis to engage one of said output gears with said driven gear thereby providing an output of said transmission depending upon the selection of the output gear of said gear train for engagement with said driven gear.

6. A variable speed transmission comprising in combination, a driving gear, a driven gear, a gear train operatively engaging said driving gear and said driven gear and including, an intermediate shaft means, a plurality of independently rotatable intermediate gears supported on said shaft means, a plurality of gear bracket means pivotally supported on said shaft means, a plurality of output gears in said gear train, each of said output gears singly and rotatably supported on a mating of said bracket means, said driving gear in driving engagement with the first of said intermediate gears, each of said intermediate gears and said output gears in said gear train having a driving and a driven portion, the driving portion of said intermediate gears engaging the driven portion of said output gears, the driving portion of said output gears engaging the driven portion of said intermediate gears to provide a continuous driving gear train, selector means, a plurality of cams positioned on said selector means engaging said bracket means to selectively and alternatively engage one of said output gears for engagement with said driven gear to provide the desired output of said transmission.

7. A variable speed transmission comprising in combination, a driving gear, a driven gear, a gear train operatively engaging said driving gear and said driven gear and including, a shaft means, a plurality of integral intermediate pinion and spur gears independently and rotatably mounted on said shaft means, a plurality of gear bracket means pivotally supported on said shaft means, a plurality of integral output pinion and spur gears rotatably mounted each on a mating of said gear bracket means, said driving gear engaging the spur gear portion of the first of said intermediate gears, the pinion portion of said gears driving the spur gear portion in said gear train to provide a speed reduction throughout said gear train, a manually operated cam shaft, a plurality of cams mounted on said cam shaft engaging a mating portion of each of said plurality of gear bracket means to selectively and alternatively engage each of said output gear means with said driven gear to provide a variable speed transmission.

8. A variable speed transmission comprising in combination, a driving gear, a driven gear, a gear train engaging said driving gear and said driven gear including, an intermediate shaft means, a plurality of integral pairs of gears independently and rotatably mounted on said shaft means, a plurality of gear brackets pivotally mounted on said shaft means, a plurality of output gears each formed in integral pairs independently and rotatably mounted one on each of said brackets, a driving and a driven portion on said intermediate gears and said output gears, said driving gear driving the driven portion of the first of said intermediate gears, the driving portion of the first of said intermediate gears driving the driven portion of said first output gear, the driving portion of said first output gear driving the driven portion of the second of said intermediate gears and in this sequence providing a gear reduction throughout the gear train, means for selectively engaging singly each of said output gears with said driven gear to provide the desired output in said transmission.

References Cited in the file of this patent
UNITED STATES PATENTS

| | | |
|---|---|---|
| 2,538,625 | Moore | Jan. 16, 1951 |
| 2,847,866 | Thurmond | Aug. 19, 1958 |
| 2,933,948 | Thompson | Apr. 26, 1960 |